(12) United States Patent
Reider et al.

(10) Patent No.: US 10,009,409 B2
(45) Date of Patent: Jun. 26, 2018

(54) RETRANSMISSION CONTROL NETWORK NODE AND RELATED METHOD

(71) Applicant: TELEFONAKTIEBOLAGET L M ERICSSON (PUBL), Stockholm (SE)

(72) Inventors: Norbert Reider, Tényö (HU); Szilveszter Nádas, Budapest (HU); Sándor Rácz, Cegléd (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 169 days.

(21) Appl. No.: 14/910,624

(22) PCT Filed: Aug. 8, 2013

(86) PCT No.: PCT/EP2013/066664
§ 371 (c)(1),
(2) Date: Feb. 5, 2016

(87) PCT Pub. No.: WO2015/018450
PCT Pub. Date: Feb. 12, 2015

(65) Prior Publication Data
US 2016/0182608 A1    Jun. 23, 2016

(51) Int. Cl.
*G06F 15/16* (2006.01)
*H04L 29/08* (2006.01)
(Continued)

(52) U.S. Cl.
CPC .............. *H04L 67/06* (2013.01); *H04L 1/187* (2013.01); *H04L 1/1809* (2013.01);
(Continued)

(58) Field of Classification Search
CPC ....... H04L 67/06; H04L 69/22; H04L 1/1809; H04L 1/187; H04L 1/1841; H04L 1/1874
See application file for complete search history.

(56) References Cited

U.S. PATENT DOCUMENTS

| 4,866,707 A | 9/1989 | Marshall et al. |
| 5,754,754 A | 5/1998 | Dudley et al. |

(Continued)

FOREIGN PATENT DOCUMENTS

| EP | 1771023 A1 | 4/2007 |
| WO | 2008082260 A1 | 7/2008 |

(Continued)

OTHER PUBLICATIONS

International Search Report and Written Opinion dated Jun. 6, 2014, in International Application No. PCT/EP2013/066664, 15 pages.

(Continued)

*Primary Examiner* — John B Walsh
(74) *Attorney, Agent, or Firm* — Rothwell, Figg, Ernst & Manbeck, P.C.

(57) ABSTRACT

To increase the utilization of the radio link and to provide a low complexity approach to retransmission control with respect to a fragmenting transmission protocol and a stream of data packets considered for data transmission, there is provided a method of retransmission control with respect to a fragmenting transmission protocol and a stream of data packets considered for transmission. The method comprises the steps detecting (S12) data packets in the stream of data packets which are unnecessary retransmissions based on sequence numbers of the data packets, dropping (S14) data packets which are unnecessary retransmissions from the stream of data packets for setup of a modified stream of data packets, and transmitting (S16) the modified stream of data packets over a transmission link.

14 Claims, 9 Drawing Sheets

(51) Int. Cl.
    *H04L 1/18*    (2006.01)
    *H04L 29/06*    (2006.01)

(52) U.S. Cl.
    CPC .......... *H04L 1/1841* (2013.01); *H04L 1/1874* (2013.01); *H04L 69/22* (2013.01)

(56) References Cited

U.S. PATENT DOCUMENTS

| | | | |
|---|---|---|---|
| 5,768,527 A * | 6/1998 | Zhu | H04L 1/0002 348/E5.008 |
| 7,870,259 B2 | 1/2011 | Meyer et al. | |
| 2002/0082023 A1 | 6/2002 | Bark et al. | |
| 2006/0179392 A1 | 8/2006 | Ota | |
| 2010/0238866 A1 | 9/2010 | Sendrowicz | |
| 2010/0246497 A1 | 9/2010 | Kim et al. | |
| 2010/0281331 A1 | 11/2010 | Hammons, Jr. | |
| 2013/0132603 A1* | 5/2013 | Cohen | H04L 1/1841 709/231 |

FOREIGN PATENT DOCUMENTS

| | | |
|---|---|---|
| WO | 2009058084 A1 | 5/2009 |
| WO | 2011120581 A1 | 10/2011 |
| WO | 2011147468 A1 | 12/2011 |
| WO | 2014063718 A1 | 5/2014 |

OTHER PUBLICATIONS

Szilveszter Nádas, et al. "HSPA Transport Network Layer Congestion Control", (Submitted as a book chapter to Handbook of HSDPA/HSUPA Technology) ETH-09:001530 Uen, Apr. 2013, 43 pages.

3GPP, 3rd Generation Partnership Project; Technical Specification Group Radio Access Network; Radio Link Control (RLC) protocol specification (Release 9), 3GPP TS 25.322 V9.1.0, 2010, 88 pages.

3GPP, 3rd Generation Partnership Project; Technical Specification Group Radio Access Network; Radio Link Control (RLC) protocol specification (Release 11), 3GPP TS 25.322 V11.2.0, 2013, 90 pages.

* cited by examiner

RETRANSMISSION CONTROL NETWORK NODE AND RELATED METHOD

CROSS REFERENCE TO RELATED APPLICATION(S)

This application is a 35 U.S.C. § 371 National Phase Entry Application from PCT/EP2013/066664, filed Aug. 8, 2013, designating the United States, the disclosure of which is incorporated herein in its entirety by reference.

TECHNICAL FIELD

The present invention relates to a method of retransmission control with respect to a fragmenting transmission protocol in the stream of data packets considered for transmission, and further to a network node implementing the retransmission control according to the present invention.

BACKGROUND

In high-speed downlink packet access networks HSDPA, a so-called RMC AM protocol is responsible for reliable data transmissions in the layer 2 between the radio network controller RNC and a user terminal UE, WO 2009/058084 A2, Efficient Flow Control in a Radio Network Controller. Here, each RLC AM entity consists of a transmitting and a receiving side. An RLC AM entity can act either as a sender or a receiver depending on the implemented procedure, where the sender is the transmitter of RLC AM packet data units PDU and the receiver receives and processes transmitted PDUs.

Due to the reliable transmission of RLC AM, it may provide seamless handover and channel switching operations. Data packets which are lost between the radio network controller RNC and the user terminal UE due to bad radio or transport network TN link conditions are retransmitted, to avoid non congestion related packet loss, which is beneficial for transmission control protocol TCP in terms of utilizing network capabilities. On the other hand, RLC retransmissions can increase the round trip time RTT significantly such that timing constraints for transmission are difficult to be met. In addition, reliable packet delivery of RLC makes it hard to drop or re-order packets, e.g., to indicate transport network TN or radio congestion.

Further, when the buffers in the network are large, several hundreds of milliseconds, the receiving side of the RLC may request the retransmission of such RLC PDU that is not lost but waiting in the buffer to be served. In the case of HSDPA, such mechanism may result in many duplicate PDUs which are waiting in a priority queue PQ of the transmitter which further increases the load on the radio interface.

In consideration of the problems explained above, one solution which is proposed so far, see US 2002/0082023 A1, Method and Apparatus for Providing Adaptive Fast Radio Congestion Control, is to introduce an RLC retransmission prohibit timer in order to improve the efficiency of RLC in case of large buffer. The timer disables to retransmit a RLC PDU when a NACK of the PDU is received at the transmitter until the timer expires.

In view of the above, the problem underlying the present invention is to increase the utilization of the radio link and to provide a low complexity approach to retransmission control with respect to a fragmenting transmission protocol and a stream of data packets considered for data transmission.

SUMMARY

According to a first aspect of the present invention there is provided a method of retransmission control with respect to a fragmenting transmission protocol and a stream of data packets considered for transmission. The method comprises the steps detecting data packets in the stream of data packets which are unnecessary retransmissions based on sequence numbers of the data packets, dropping data packets which are unnecessary retransmissions from the stream of data packets for setup of a modified stream of data packets, and transmitting the modified stream of data packets over a transmission link.

According to a second aspect of the present invention there is provided a network node for providing retransmission control with respect to a fragmenting transmission protocol and a stream of data packets considered for transmission. The network node comprises at least one interface to establish a transmission link, at least one processor, and a memory comprising instructions to be executed by the at least one processor, whereby the network node is adapted to detect data packets in the stream of data packets which are unnecessary retransmissions based on sequence numbers of the data packets, drop data packets which are unnecessary retransmissions from the stream of data packets for setup of a modified stream of data packets, and transmit the modified stream of data packets over the transmission link.

According to a third aspect of the present invention there is provided a computer program which, when being executed by at least one processor of a network node, causes the network node to execute a method according to the first aspect of the present invention.

According to a fourth aspect of the present invention there is provided a computer program product, comprising program code to be executed by at least one processor of a network node, thereby causing the network node to execute a method according to the first aspect of the present invention.

BRIEF DESCRIPTION OF DRAWINGS

In the following, preferred embodiments of the present invention will be explained with respect to the drawing in which.

DETAILED DESCRIPTION

Figure 1:
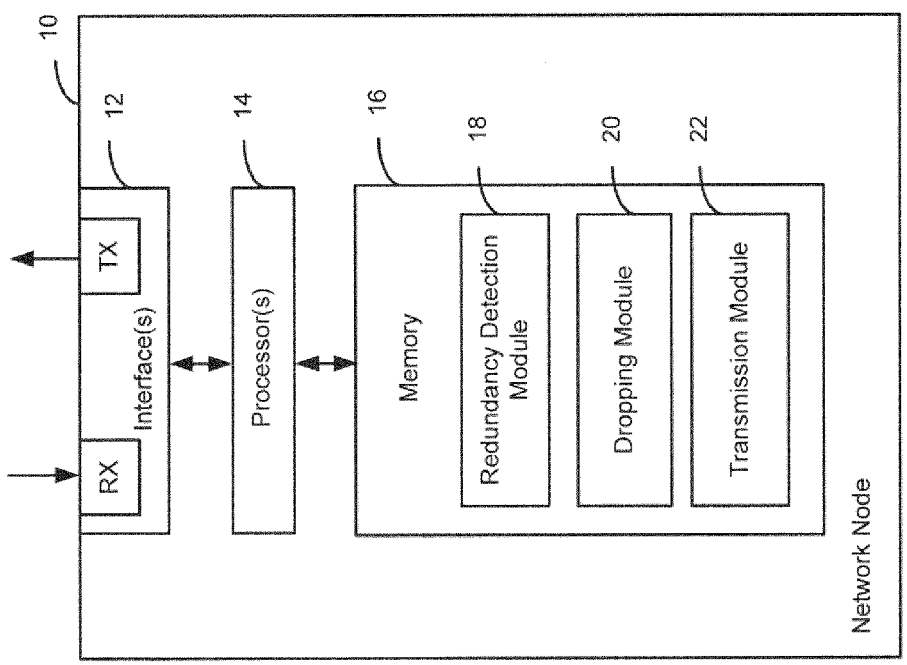
FIG. 1 shows a schematic diagram of a network node for retransmission control according to the present invention.

FIG. 1 shows a schematic diagram of a network node providing retransmission control with respect to a fragmenting transmission protocol in the stream of data packets considered for transmission. It illustrates an exemplary structure which may be used for implementing the concepts underlying the present invention in a network node, e.g., a Node B of a cellular network.

As shown in FIG. 1, the network node 10 may include at least one interface 12, e.g., a radio interface. The interface 12 is suitable for wireless information exchange, e.g., with a user terminal such as a cellular phone. In some scenarios, the interface 12 may also be used for exchanging information with a further network node, e.g., a radio network controller RNC in a wireless network. Alternatively, the network node 10 may comprise a further suitable interface configured for communication with a further network node. RX represents a receiving capability of the at least one interface 12, and TX represents a sending capability of the at least one interface 12.

As shown in FIG. 1, the network node 10 comprises at least one processor 14 coupled to the interface 12 and a memory 16 coupled to the processor(s) 14. The memory 16 may include a read-only memory ROM, e.g., a flash ROM, a random access memory RAM, e.g., a dynamic RAM DRAM or a static RAM SRAM, a mass storage, e.g., a hard disc or solid state disc, or the like. The memory 16 also includes instructions, for example suitably configured program code to be executed by the processor(s) 14 in order to implement a later described functionality of the network node 10. This functionality will be referred to in the following as modules. It is noted that these modules do not represent individual hardware elements of the network node 10, but rather represent functionalities generated when the one or more processors 14 execute the suitably configured program code.

As shown in FIG. 1, the memory 16 may include suitably configured program code to implement a redundancy detection module 18, a dropping module 20, and a transmission module 22. Further, the suitably configured program code in the memory 16 may also implement a control module for implementing various control functionalities, e.g., for controlling the network node 10 as to establishing and/or maintaining radio links, or the like.

Figure 2:
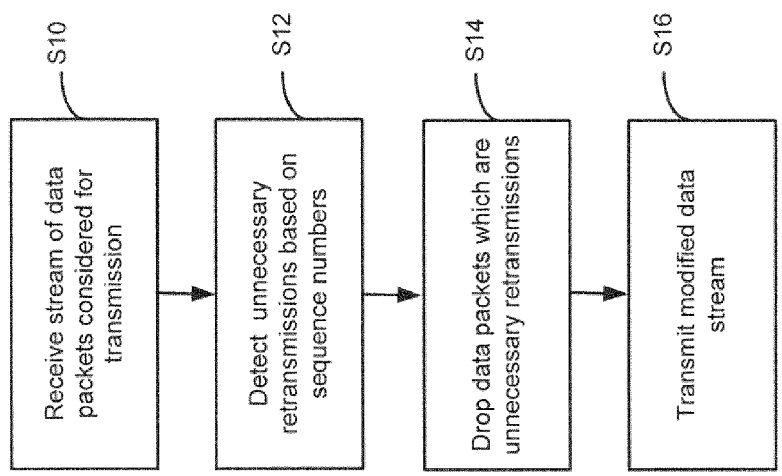
FIG. 2 shows a schematic diagram of operation of the network node according to FIG. 1.

FIG. 2 shows a flowchart of operation for the network node 10 as shown in FIG. 1.

As shown in FIG. 2, initially there is executed a step S10 by the interface 12 to receive a stream of data packets considered for transmission. Here, it should be noted that the step S10 may be optional when the data packets are already pre-stored in the network node 10.

As shown in FIG. 2, then follows a step S12, operatively being executed by the redundancy detection module 18 in cooperation with the processor 14, to detect unnecessary retransmissions based on sequence numbers comprised in data packets considered for transmission.

As shown in FIG. 2, then follows a step S14 operatively being implemented by the dropping module 20 in cooperation with the one or more processors 14, to drop data packets which are unnecessary retransmissions. Preferably, according to the present invention, data packets having identical sequence numbers are detected as unnecessary retransmissions.

As shown in FIG. 2, finally there follows a step S16, operatively being executed by the transmission module 22 in cooperation with the processor(s) 14, to transmit the data packets which remain after dropping of unnecessary retransmissions, referred to as modified data stream in the following.

In conclusion, according to the present invention there is achieved an increase of the utilization of a link, e.g., a radio link, for introduction of a low complexity solution for retransmission control in the network node, e.g., a Node B, which solution avoids sending same data packets, e.g., RLC PDUs multiple times. Thereby, the present invention reduces the load on the radio interface that might be suffering from congestion. The proposed solution requires only the sequence numbers SN of the data packets residing in the priority queue PQ of the network node. The proposed solution drops such data packets from transmission that are identified as unnecessary retransmissions.

Overall, the present invention provides the advantage of increasing the utilization of a link, e.g., a radio link, by avoiding transmission of the same data packets multiple times over the link. Further, this allows decreasing also the end-to-end round trip time RTT.

Figure 3:
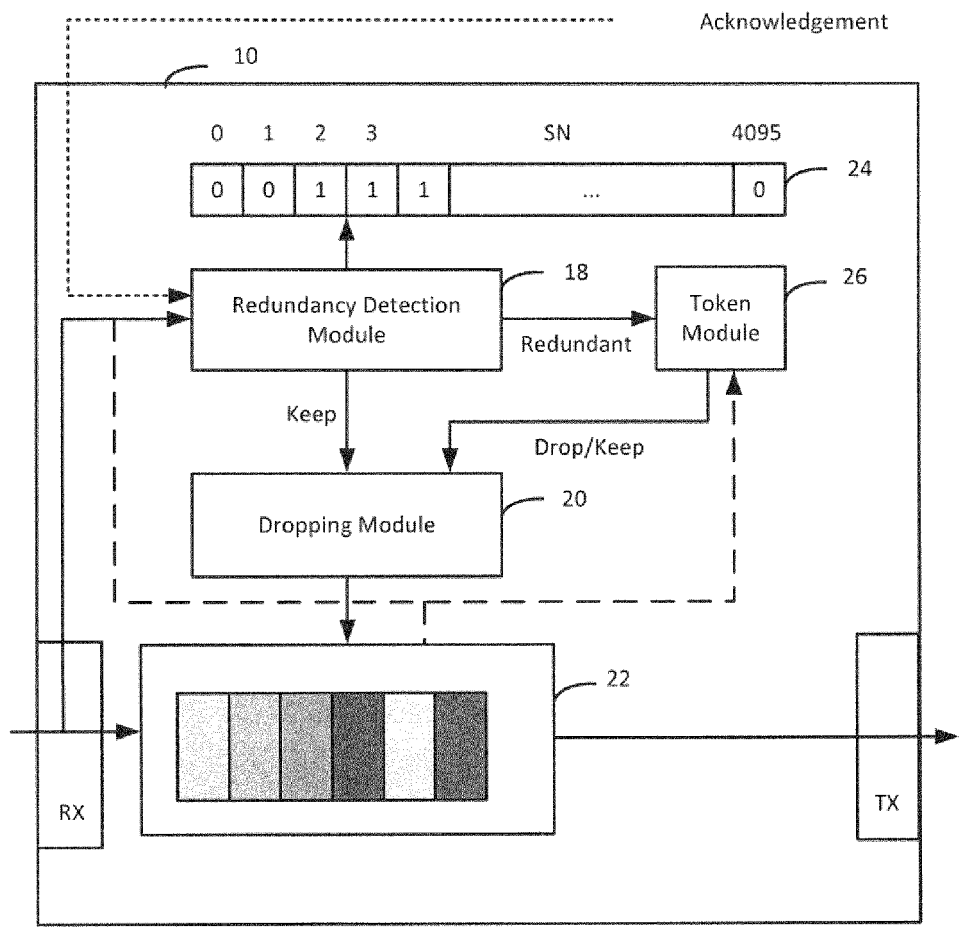
FIG. 3 shows a further detailed schematic diagram of the network node shown in FIG. 1.

FIG. 3 shows a further detailed schematic diagram of the network node 10 shown in FIG. 1. It explains a more detailed structure for implementing the concepts according to the present invention in the network node 10.

As shown in FIG. 3, in addition to the redundancy detection module 18, dropping module 20, and transmission module 22 already explained with respect to FIG. 1, the memory 16 also comprises a bit map module 24. Also, in the network node 10 there is provided a token module 26, which is implemented by use of the processor 14 in cooperation with the memory 16 to store a token value of the token module 26. It should be understood that the respective modules according to the present invention are not limited to represent separate hardware elements, but are merely illustrated as separate modules for understanding the various functionalities of the at least one processor 14. Further, without limiting scope of the present invention, the transmission module 22 is shown for implementing a priority queue where data packets are stored in-sequence prior to transmission thereof.

Figure 4:
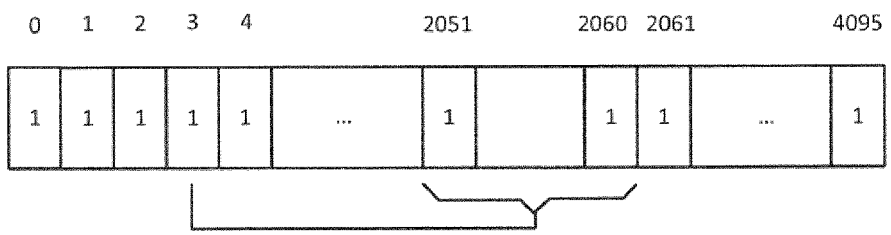
FIG. 4 shows a schematic diagram of implementing a bit map according to the present invention.

FIG. 4 shows a schematic diagram according to an implementation of the bit map as shown in FIG. 3.

As shown in FIGS. 3 and 4, the at least one processor(s) 14 and the memory 16 implement a bit map module 24 adapted to allocate a transmission state bit with respect to every sequence number in a sequence number space, i.e. 0 to 4095 in FIGS. 3 and 4. Further, the bit map module 24 is adapted to initialize all transmission state bits to a first bit value, e.g., 0, prior to start of the transmission of data packets.

Further, the transmission module 22 is adapted to transmit a data packet considered for transmission when the related transmission state bit of the sequence number assigned to the data packet is of the first value, i.e., a value of 0.

As shown in FIGS. 3 and 4, the bit map module 24 is adapted to set a transmission state bit of a sequence number assigned to a transmitted data packet to a second value being different from the first value, e.g., a value of 1, upon receipt of a transmission acknowledgement for the transmitted data packet.

Further, the dropping module 20 shown in FIG. 3 is adapted to drop the data packet considered for transmission when the transmission state bit of the sequence number assigned to the data packet is of the second value. Preferentially, the dropping module 20 is adapted to drop the data packet prior to storage of the data packet in a priority queue of the transmission module 22.

As shown in FIG. 3, the at least one processor(s) 14 in functional cooperation with the memory 16 also implements a token module 26. Operatively, the token module 26 allows achieving retransmission of a data packet of which the state bit is of the second value under the condition that a token bucket of the token module 26 is higher than a predetermined threshold.

FIG. 4 shows a schematic diagram of implementing the bit map module 24 according to the present invention.

As explained above, the bit map module 24 supports a decision whether a data packet in a priority queue is to be transmitted or should be removed from the priority queue or discarded prior to storage thereof in the priority queue. The reason to disregard a data packet from retransmission might be that it can be a retransmission of a previous data packet that has already been sent through the transmission link successfully. In this case, there would be no need to raise transmission resources for retransmission of this data packet.

As shown in FIG. 4, the bit map module 24 initializes the bit map as allowing the transmission for any sequence number, i.e., such that the transmission state is set to 0 for all indices, wherein an index corresponds to a data packet sequence number, e.g., a RLC PDU sequence number. Then, when a data packet is about to be served by the network node 10, the redundancy detection module 18 checks the corresponding transmission state bit in the bit map. If the latter is of the first value, then the data packet is transmitted over the interface 12. If the latter is not of the first value, then it is assumed that the data packet corresponds to a retransmission and the data packet is likely not transmitted over the interface 12, as will be explained in the following.

As shown in FIG. 3, in case of a successful transmission of the data packet, i.e., a positive acknowledgment like a HARQ feedback, the corresponding transmission state bit is set to the second value, i.e. a value of 1, in the bit map module 24. For the subsequent operation of the network node 10, this operation indicates that when a retransmitted replica of this data packet arrives at the network node 10, the replica can be simply discarded, since the data packet has been successfully delivered to the receiver. However, in case of a failure, then the network node 10 could not send the data packet such that the corresponding transmission state bit remains of the first value in the bit map module 24.

Further and as shown in FIG. 4, according to the present invention it is suggested to implement a sliding window mechanism with respect to the bit map module 24. Based on the sliding window mechanism, it is possible to decide whether a given data packet, e.g., a RLC PDU, is a retransmission of a previously sent data packet or is a newly transmitted data packet. The sliding window mechanism ensures that at most half of a window size, hence window_size/2, number of data packets can be transmitted over the network without a requirement that prior to transmission an acknowledgement is received with respect to the previously transmitted data packet(s). Therefore, if a data packet with a sequence number SN-y arrives at the transmission module 22 and the related priority queue, then the proposed solution resets the transmission state bit of all data packets with sequence numbers x to 0 for which the following relation applies:

$$(y+\text{window\_size}/2) \bmod \text{window\_size} <= x < (y+10+\text{window\_size}/2) \bmod \text{window\_size}.$$

The parameter window_size can be an RLC window size, hence RLC_window_size, in case of RLC. Therefore, in the bit map module 24, the transmission state bit for all data packets having sequence numbers in the above-captioned range are reset to 0, according to the example shown in FIG. 4. These are the next 10 sequence numbers which are outside the sliding window. It should be noted that the window size shown in FIG. 4 is an example only and can generally be any value lying in the range of the sequence numbers. Also, according to FIG. 4 the value of 10 is selected as an example, but can be also any suitable value.

Figure 5:
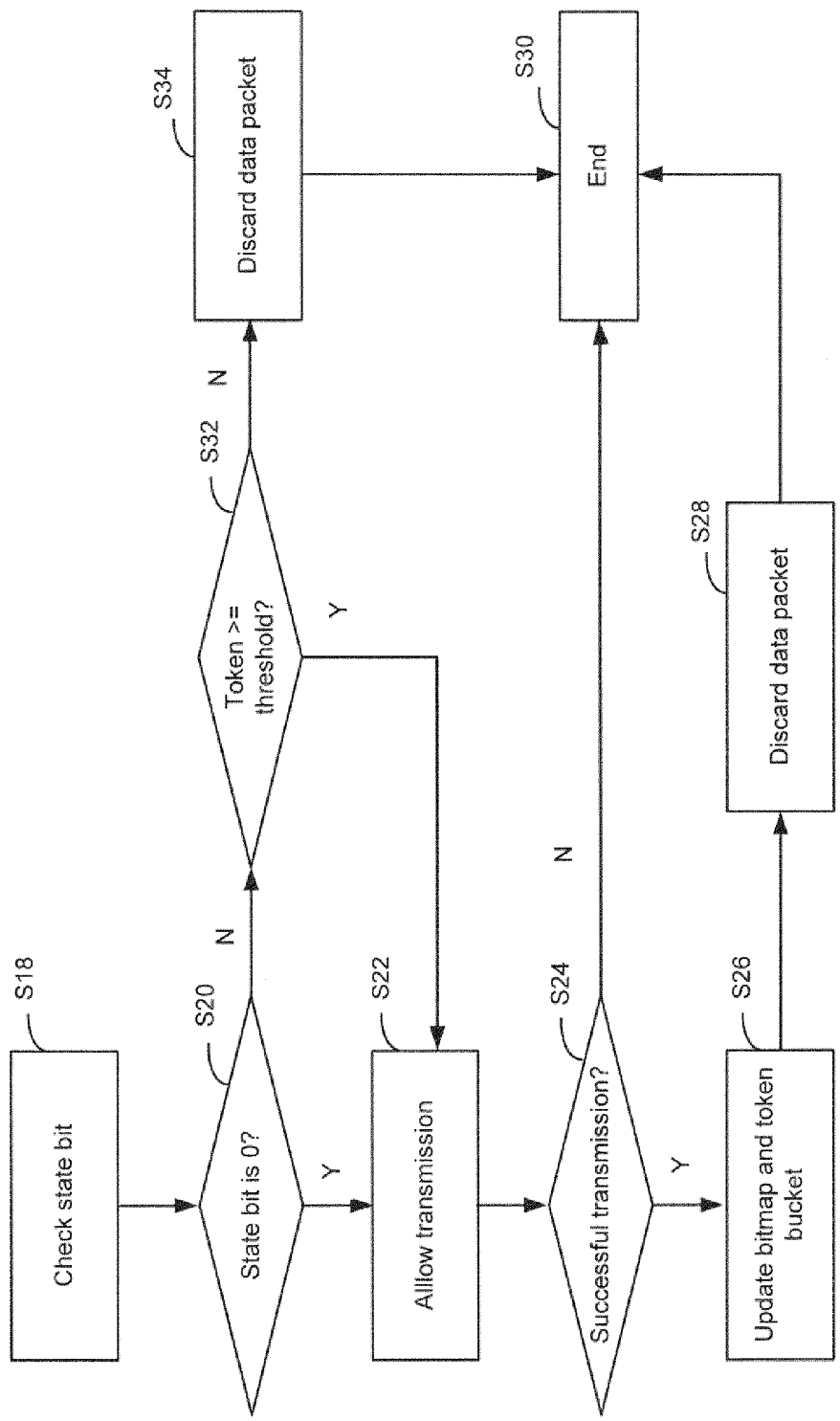
FIG. 5 shows a further detailed flow chart of operation of the network node shown in FIG. 3.

FIG. 5 shows a further detailed flow chart of operation for the network node shown in FIG. 3.

As shown in FIG. 5, upon consideration of retransmission of a data packet, initially there is executed a step S18, operatively being executed by the redundancy detection module 18, to check the status bit of the sequence number for the considered data packet. Then follows a step S20 implemented again by the redundancy detection module 18, to check if the transmission state bit is of the first value, e.g., a value of 0. If so, there follows a step S22 executed by the dropping module 20, to grant transmission of the data packet.

As shown in FIG. 5, then there follows a step S24 to evaluate the success of transmission of the considered data packet, operatively being executed by the transmission module 22. Here, successful transmission of the considered data packet may be confirmed upon receipt of a positive transmission acknowledgement.

As shown in FIG. 5, upon successful transmission of the data packet, then the bit map module 24 will update the bit map and the token module 26 will update the token bucket in a step S26. In particular, the token module 26 is adapted to increase the size of the token bucket by a first predetermined step size upon receipt of a transmission acknowledgement during transmission of data packets and/or upon expiry of a pre-determined period of time. Also, the token module 26 is adapted to decrease the size of a token bucket by a pre-determined second step size upon redundant transmission of a data packet.

Further, to update the bit map, the bit map module 24 is adapted to identify a first window of sequence numbers in the sequence number space such that data packets having a sequence number lying in the first window may be transmitted without receipt of an acknowledgement when a new data packet is considered for transmission. Also, the bit map module 24 is adapted to identify a second window of sequence numbers in the sequence number space adjacent to the first window of the sequence numbers when a new data packet is considered for transmission and to reset the transmission state bits in the second window of sequence numbers to the first value, i.e., a value of 0, when the new data packet is considered for transmission.

As shown in FIG. 5, subsequent to the update procedures, then there follows a step S28, executed by the transmission module 22, to discard the successfully transmitted data packet from further consideration. Then will follow a step S30 to terminate the re-transmission control with respect to the considered data packet.

As shown in FIG. 5, a further flow of operation with respect to re-transmission control of a specific data packet is related to a case where the state bit of the data packet is set to the second value, i.e., a value of 1, and accordingly the determination in the step S20 results in not true. This would indicate that the related data packet should be discarded for re-transmission if only the transmission state bit were considered. However, as shown in FIG. 5, according to the present invention there is implemented a certain mechanism to also allow re-transmission of such related data packets. This is achieved by a further step S32, implemented by the token module 26. The token module 26 evaluates a token bucket in comparison to a predetermined threshold value. If the evaluation in step S32 shows that the token bucket is equal or larger than a threshold value, then follows the step S22 to grant transmission of the data packet. Otherwise, in the case that the token bucket is smaller than the threshold, then will follow a step S34, implemented by the dropping module 20, to discard the related data packet from re-transmission. Subsequent thereto, the re-transmission control with respect to the considered data packet terminates in step S30.

In conclusion and as shown in FIG. 5, the dropping module 20 is adapted to drop a data packet considered for transmission when the transmission state bit of the sequence number assigned to the data packet is of the second value, e.g., a value of 1. Here, the dropping module 20 is adapted to drop the data packet prior to storage of the data packet in the priority queue of the transmission module 22 or subsequent thereto. As shown in FIG. 5, according to the present invention the dropping module 20 is implemented to not only consider the transmission state bit of the sequence number assigned to a data packet considered for re-transmission, but also to consider a token bucket. If the token bucket is lower than a predetermined threshold, the data packet will be dropped from re-transmission if the related transmission state bit is of the second value and otherwise the data packet will be allowed for re-transmission irrespective of the value of the transmission state bit.

Overall, if a transmission state bit of a data packet is of the second value in the bit map, the decision according to the present invention is that this data packet is redundant, which means that most likely it has already been transmitted successfully to the user terminal.

However, in order to make the transmission over the link more robust and to consider protocol abnormalities and other side effects negatively impacting an ideal functionality of the fragmenting transmission protocol, the present invention applies the token bucket algorithm as well. If there is a token bucket higher than a predetermined threshold, e.g., the threshold being 1.0, it is suggested to keep a possibly redundant data packet in the priority queue, while otherwise it will be discarded. Each time a data packet is served from the priority queue of the transmission module 22, it is suggested to add a predetermined step size, e.g., 0.05, to the token bucket to allow for re-transmission of a number of the data packet with the number being defined in accordance to a ratio between the predetermined step size and the predetermined threshold, e.g., 5% of data packets in case of a step size of 0.05 and a threshold of 1, even though it most likely already arrived at the mobile terminal without error. This feature according to the present invention is useful, e.g., when the uplink acknowledgements, e.g., HARQ feedbacks, are erroneous.

Also, according to the present invention, the token bucket has a maximum size, e.g., a value of 20. For example, if the maximum size of the token bucket may be reached, a new token cannot be added in the step S26 to the token bucket. If a further data packet with a transmission bit state of the first value may be to be served from the priority queue, this further data packet may be sent. If a further data packet with a transmission state bit of the second value may be to be served from the priority queue, this further data packet may be sent, since the tokens in the token bucket are above the threshold. In both options, the token bucket might not be updated by an addition of a token. Decreasing the token bucket by a token upon sending an unnecessary retransmission may also be performed. In another example, the token bucket may be already empty, and data packets with a transmission bit state of the second value may be sent as long as a token can be removed from the token bucket upon sending an unnecessary retransmission. Otherwise the data packet will be discarded. In one embodiment, the token bucket may be initialized to be full. Additionally or alternatively to adding some tokens for transmitted data packet, tokens can be added on a time basis, e.g., one token every 100 ms. In another example, a token of a value of 0.05 can be added to the token bucket each time a data packet is served in the priority queue, and the token bucket can be decreased by one 1 token each time an unnecessary re-transmission is sent over the transmission link. Thereby, a robust re transmission control mechanism may be enabled.

Further to the above, it should be noted that the check of the transmission state bit of a data packet can be done at the arrival of the data packet at network node 10 to discard it immediately upon identification of retransmission so as to reduce the memory usage. Further, it should be noted that unnecessary re-transmission of data packets may occur, e.g., when the link to the user terminal is congested and many data packets are waiting in the priority queue to be served, but the receiver side of the data stream requests the retransmission of some data packets. In this case, the network node 10 can simply discard the transmission of those data packets using the above solution, and thereby the load on the congested link may be decreased.

Overall, the provision of a bit map and the token module increases the utilization of the link by avoiding transmission of the same data packets multiple times. Also, it is possible to decrease the round trip time RTT during data transmission.

Figure 6:
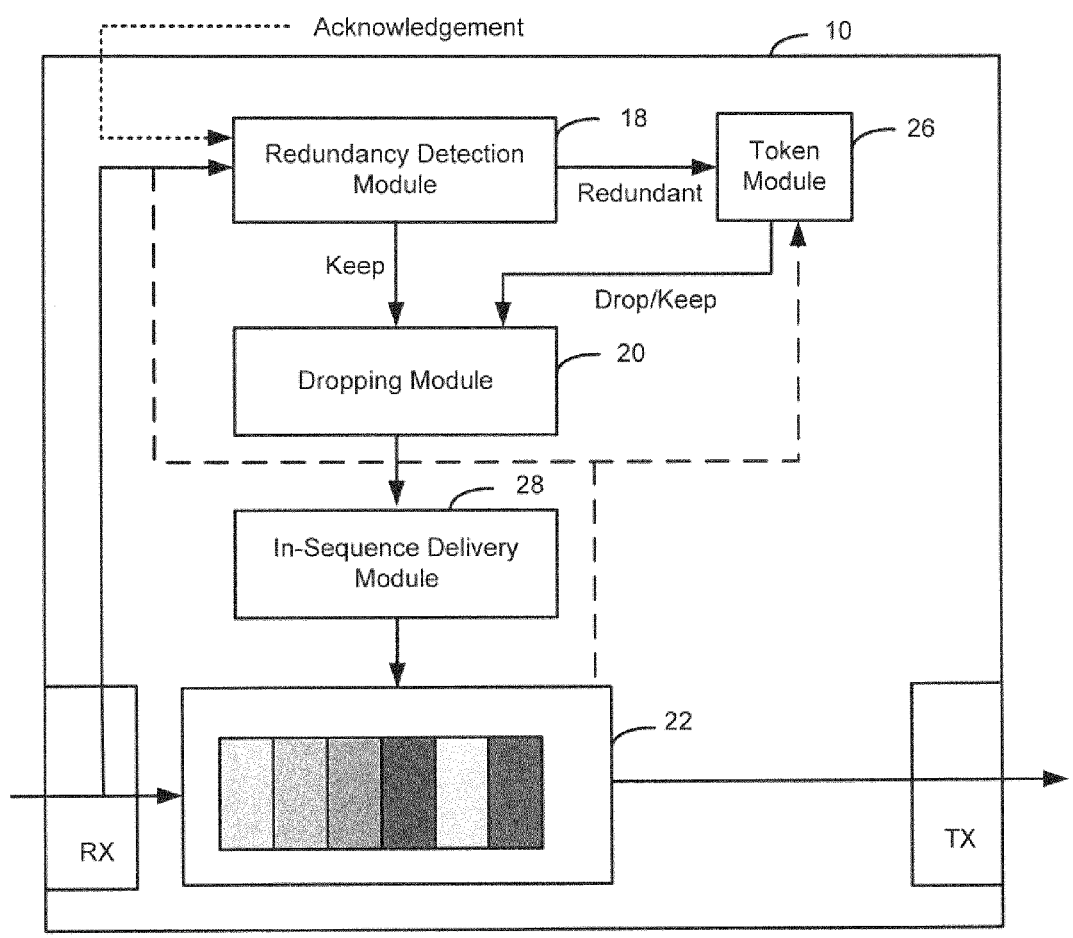
FIG. 6 shows a schematic diagram of a further modified implementation of the network node shown in FIG. 1.

FIG. 6 shows a schematic diagram of a further modified implementation of the network node 10 shown in FIG. 1.

As shown in FIG. 6, additionally or instead of using a bit map, the modified implementation of the network node 10 illustrated in FIG. 6 relies on in-sequence delivery of data packets during transmission thereof. To this purpose, the at least one processor(s) 14, in cooperation with the memory 16, implements an in-sequence delivery module 28 adapted to build an ordered data structure representing an order of data packets according to an in-sequence delivery thereof on the basis of the sequence number. In more detail, the in-sequence delivery module 28 establishes an ordered data structure allowing that a data element can be added, a data element with a lowest sequence number can be fetched, and the data element with the highest sequence number can be fetched. The data structure may also allow that a duplicate data element may be dropped. A duplicate data element may have an identical sequence number compared to another data element in the ordered data structure.

As shown in FIG. 6, the remaining parts of the network node 10 are similar to those illustrated with respect to FIG. 3 and therefore repeated explanation thereof is omitted here.

Figure 7:
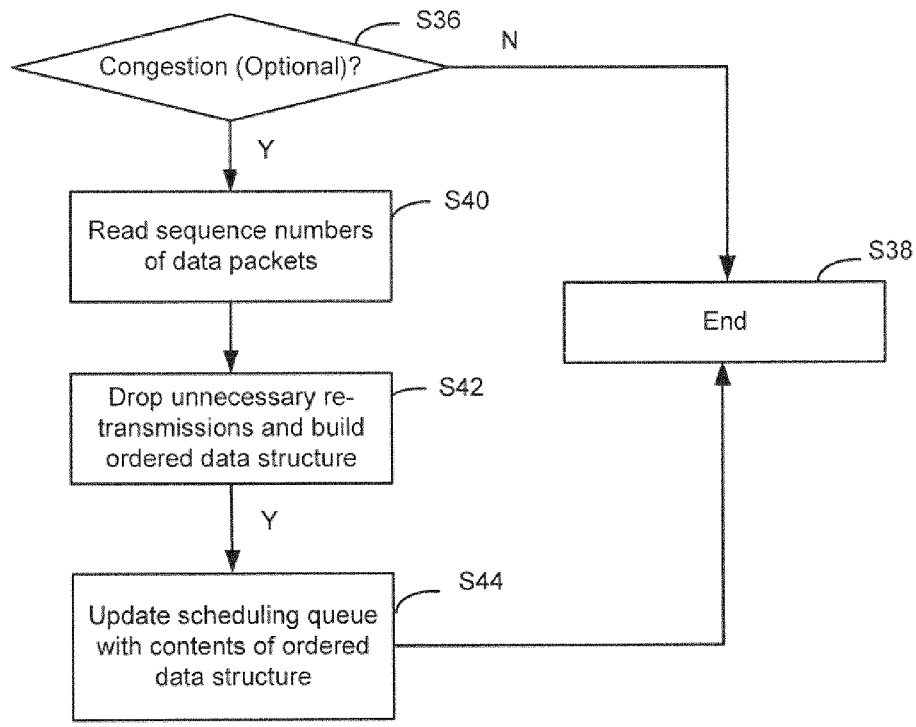
FIG. 7 shows a flow chart of operation for the network node shown in FIG. 6.

FIG. 7 shows a flowchart of operation for the network node 10 shown in FIG. 6.

As shown in FIG. 7, initially the network node 10 executes a step S36, which is optional, to evaluate whether there exists congestion on the transmission link. If not, there follows a step S38 to terminate the re-transmission control.

Generally, congestion of the link can be detected, e.g., based on whether the length of the priority queue is above a predetermined threshold.

As shown in FIG. 7, if the evaluation in the step S36 results in not true, then follows a step S40, operatively being executed by the redundancy detection module 18, to read the sequence numbers of data packets. Then follows a step S42, operatively being executed by the dropping module 20 and the in-sequence delivery module 28, to drop redundant data packets and to build the ordered data structure for in-sequence delivery of the data packets. It should be noted that the ordered data structure may be a specific one designed for the purpose of the present invention or can be an already existing one. The aforementioned data structure may have to meet the following properties, a data element can be added, the lowest and highest element may be fetched, and duplicate elements can be dropped. Subsequent thereto, there follows a step S44, also being executed by the in-sequence delivery module 28, to update the priority queue with contents of the ordered data structure.

Figure 8:
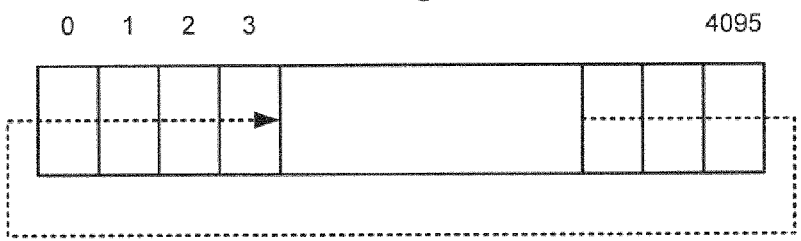
FIG. 8 shows a schematic diagram of a sliding window implemented with respect to a priority queue buffer.
Figure 8:
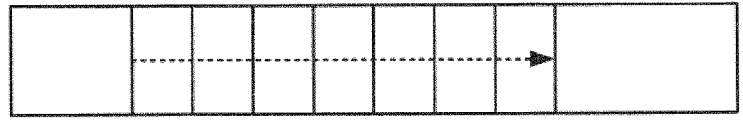

FIG. 8 shows a schematic diagram of a sliding window implemented with respect to a priority queue buffer.

FIG. 8 shows two examples of a status of a sliding window where the direction of the error indicates a true error of the data packets. As shown in FIG. 8, due to the sliding window mechanisms, the sequence number may not necessarily reflect the true sending order. Therefore, in the following there will be explained an algorithm to determine the ordered data structure so as to establish the right order of the data packets in the network node 10 without requesting information from other network elements, information with respect to the RLC window status from the radio network RNC side RLC protocol.

In the following, the algorithm for establishing and building the ordered data structure will be explained with respect to FIG. 9 and FIG. 10.

Figure 9:
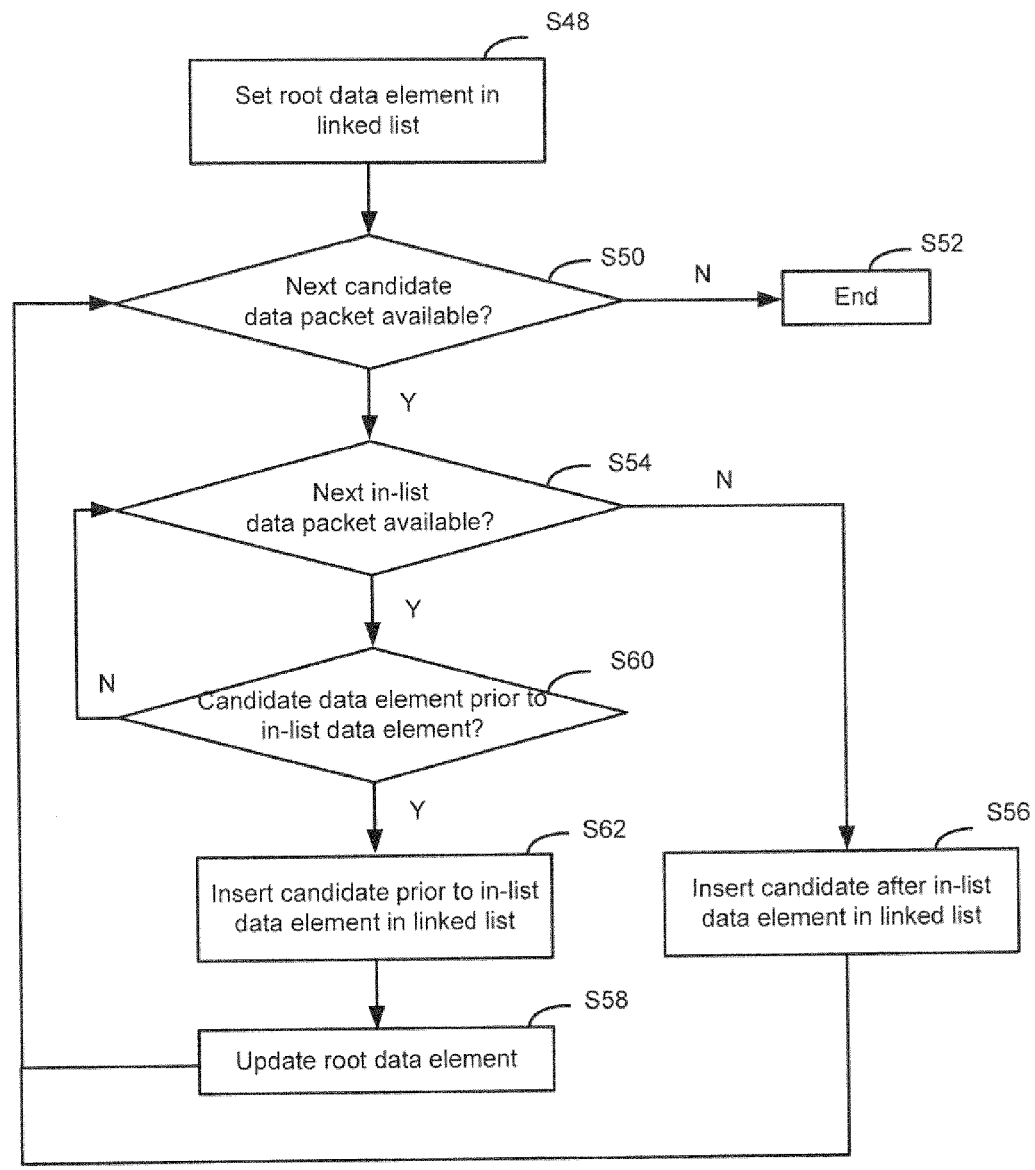
FIG. 9 shows a flow chart of operation for an in-sequence delivery module shown in FIG. 6.

FIG. 9 shows a flow chart of operation for the in-sequence delivery module 28 shown in FIG. 6 so as to establish an in-order sequence for considered data packets.

Generally, it should be noted that according to the present invention dropping can be done at any suitable time when it is recognized that two data packets have identical sequence numbers.

As shown in FIG. 9, the in-sequence delivery module 28 shown in FIG. 6 is adapted to establish the ordered data structure as a link list by executing the following steps:

initialize (S48) the linked list with a selected data packet having a sequence number as root data element having a lowest sequence number;

get (S50) a next selected data packet from selected data packets which are not yet stored in the linked list as candidate data packet having a candidate sequence number;

evaluate (S50) a first condition whether a next candidate data packet exists;

if the first condition is not true, terminate (S52) the generation of the linked list;

if the first condition is true, get (S54), starting from the root data element having a lowest sequence number in the linked list to the data element with a highest sequence number in the linked list, a next in-list data packet having a comparison sequence number;

evaluate (S54) a second condition whether the next in-list data packet exists;

if the second condition is not true, insert (S56) the candidate data packet subsequent to the current in-list data packet in the linked list, and repeating all steps following the initialization of the linked list;

if the second condition is true, evaluate (S60) a third condition whether the candidate data packet is to be inserted into the linked list prior to the next in-list data packet;

if the third condition is true, insert (S62) the candidate data packet into the linked list prior to the next in-list data packet, updating (S58) the root data element, and repeating all steps following the initialization of the linked list; and if the third condition is not true, repeat the step (S54) of getting the next in-list data packet and all following steps.

Figure 10:
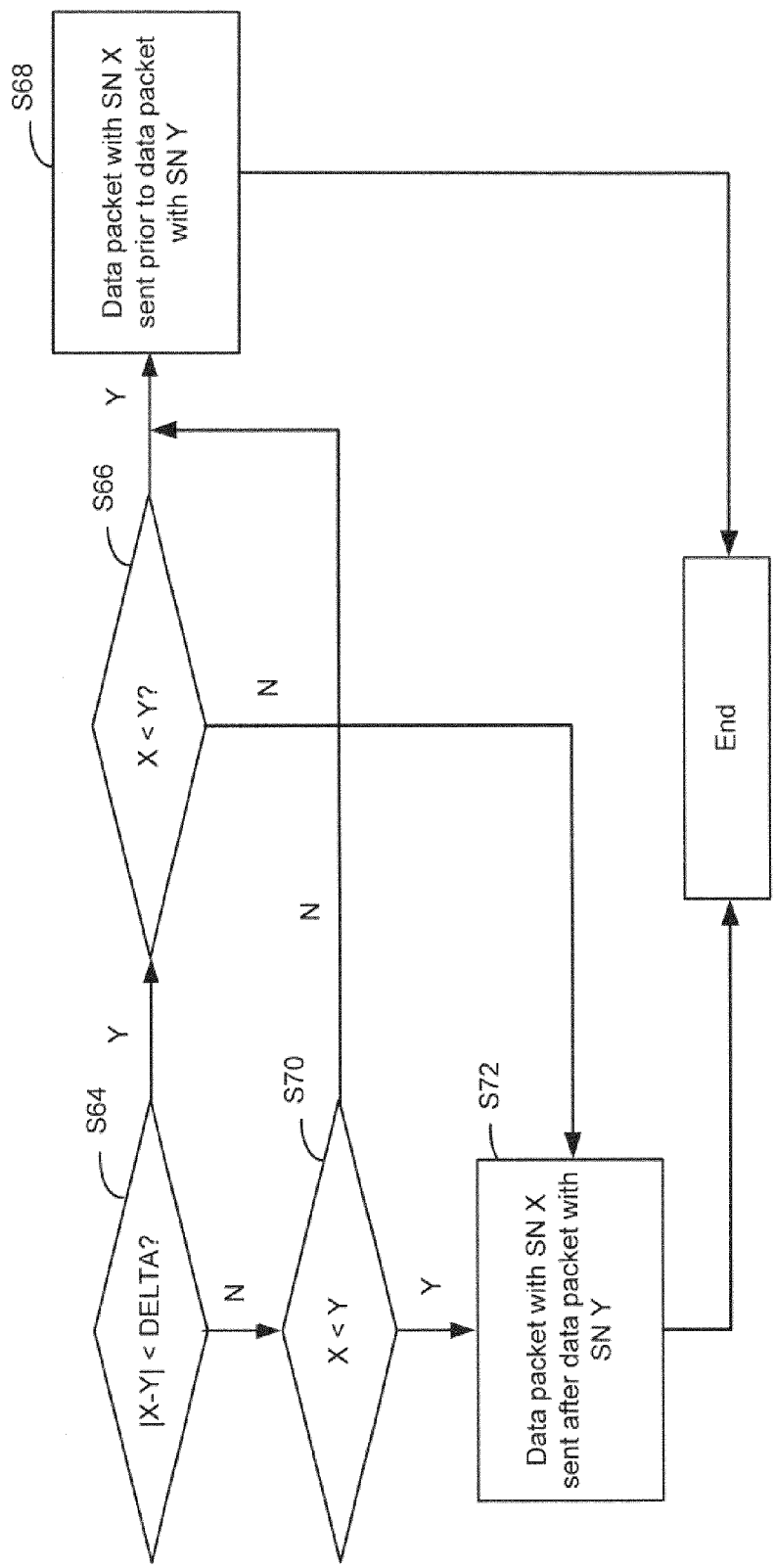
FIG. 10 shows a further detailed flow chart of operation for the in-sequence delivery module shown in FIG. 6.

Further to the above, FIG. 10 shows a further detailed flow chart of operation for the in-sequence delivery module 28 shown in FIG. 6. In particular, this flow chart shows further details of the relation whether a candidate data element is to be added prior to the in-list data element or not. In more detail, in the following it is assumed that two data packets are considered wherein the sequence number of a first data packet is X and the sequence number of the second data packet is Y. In view of this, the in-sequence delivery module 28 shown in FIG. 6 is adapted to implement the interrogation step S60 shown in FIG. 9 by execution of the following further steps:

evaluate (S64) a fourth condition whether an absolute difference between the candidate reference number and the comparison sequence number is smaller than a pre-determined comparison threshold;

if the fourth condition is true, evaluate (S66) a fifth condition whether the candidate sequence number is smaller than the comparison sequence number;

if the fifth condition is true, determine (S68) that the candidate data packet is to be transmitted before the next in-list data packet;

if the fourth condition is not true, evaluate (S70) a sixth condition whether the candidate sequence number is smaller than the comparison sequence number; and if the sixth condition is true, determine (S72) that the candidate data packet is to be transmitted after the next in-list data packet.

Further to the explanations given with respect to FIG. 10, the inventive approach to determine a desired order of two data packets having a sequence number X and Y may be represented in pseudo-code representation as follows:

if $|x-y|<\Delta$ then
   if x<y then data packet with SN x is to be sent before data packet with SN y
   else data packet with SN x is to be sent after data packet with SN y
else
   if x<y then data packet with SN x is to be sent after data packet with SN y
   else data packet with SN x is to be sent before data packet with SN y.

In the above-captioned algorithm, the parameter $\Delta$ may be set to, e.g., a value of 2000, in consideration that a maximum window size has a value of 4096.

It should be noted that the approach described with respect to FIG. 10 may be implemented based on information only from the network node, e.g., a Node B without requiring radio network controller-side communication. The proposed solution has the advantages of increasing the utilization of the link by avoiding transmission of the same data packets multiple times of the radio link and by decreasing the end-to-end round trip time. Also, there is ensured an in-sequence delivery of data packets over the link.

Figure 11:
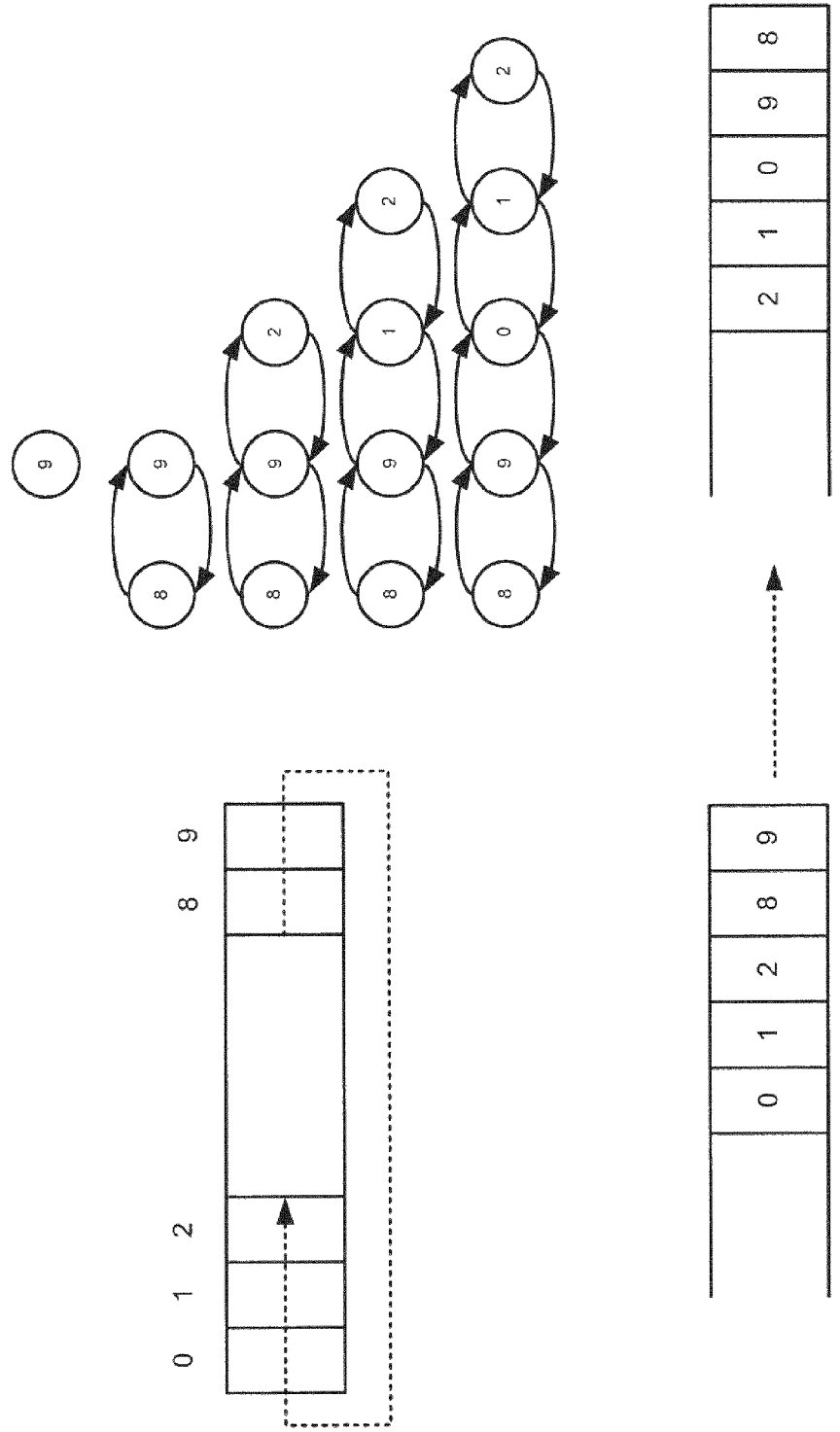
FIG. 11 shows a representative example illustrating the outcome of operation of the in-sequence delivery module according to the method shown in FIGS. 9 and 10, respectively.

FIG. 11 shows a representative example illustrating the outcome of operation of the in-sequence delivery module as explained above.

In more detail, the upper left part of the FIG. 11 shows an order of data packets and related sequence numbers in the priority queue prior to the application of the proposed in-sequence solution. Correspondingly, the lower left part illustrates a similar constellation, however, without a sliding window spreading across the beginning and the end of the priority queue. The upper right part shows the establishment of a link list representing the in-sequence delivery order, and the lower left part shows the contents of the priority queue after the established link list is stored back to the priority queue.

As shown in FIG. 11, the application of the in-sequence delivery approach according to the present invention reverses the order of the sequence numbers 8 and 9. Also, the in-sequence approach reverses the storage order of the data packets carrying the sequence numbers 2, 1, and 0 into a reverse order.

Figure 12:
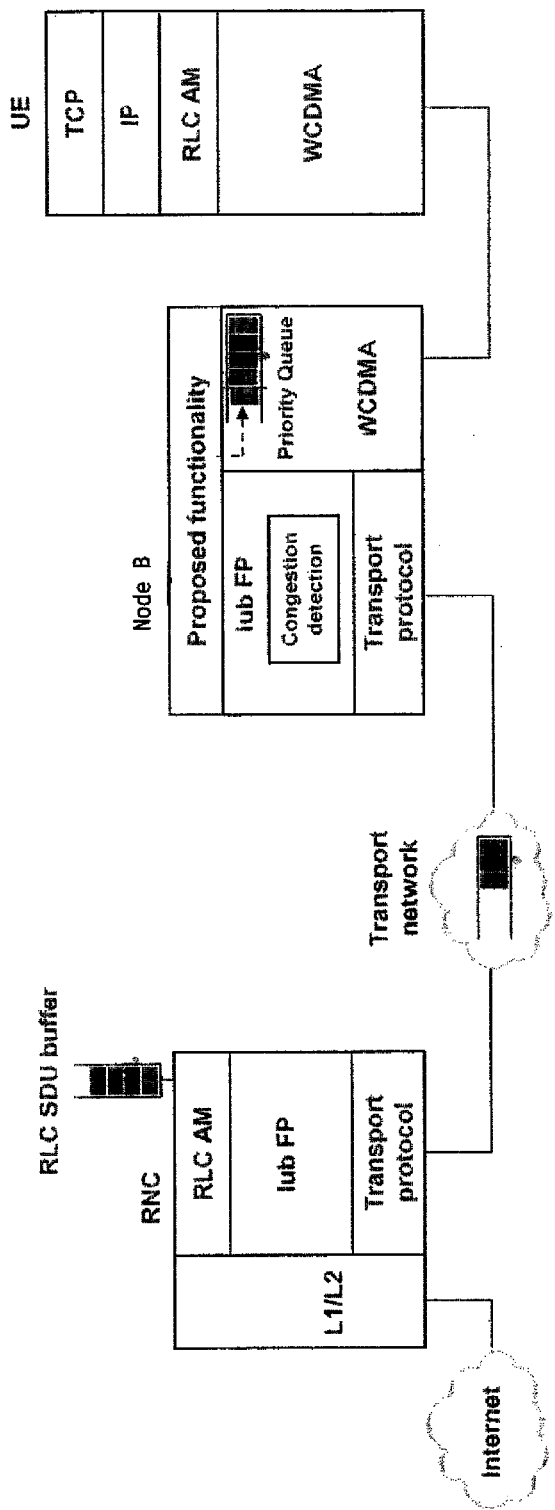
FIG. 12 shows an example of application of the present invention with respect to WCDMA wireless data packet transmission over a wireless transmission link.

FIG. 12 shows an example of application of the present invention with respect to WCDMA wireless data packet transmission over a wireless transmission link.

According to the example shown in FIG. 12, data packets are RLC data packet PDUs on the layer 2 of radio transmission. Also, the network node 10 relates to a Node B in the WCDMA wireless network. Further, congestion of the radio link towards the user terminal UE is detected based on the length of the priority queue. Still further, the functionality according to the present invention is added to the Node B so as to read sequence numbers of RLC PDUs, build up the data structure based on the read sequence numbers using the algorithms explained above, and to replace the priority queue according to the ordered content of the established data structure. Further, while above the ordered data structure has been explained as a link list, those skilled in the art will appreciate that also the binary search tree BST may provide the same functionality. However, the link list is expected to be more efficient than the binary search tree, since the majority of the RLC PDUs remains in order in the priority queue which is advantageous in case of link lists, but could lead to unbalanced binary search trees such that the search complexity increases from O(log n) to O(n). However, the exact type of the data structure may be different based on implementation constraints and therefore should not be construed as limiting the scope of the present invention.

Further, according to the application scenario shown in FIG. 12, what is considered is high-speed downlink packet access HSDPA, wherein the RLC AM protocol is responsible for reliable data transmissions in layer 2 between the radio network controller RNC and the user terminal UE. Each RLC AM entity consists of a transmitting and a receiving side. An RLC AM entity can act either as a sender or as a receiver depending on the elementary procedure, where the sender is the transmitter of the RLC AM PDUs and the receiver receives and processes the transmitted PDUs.

Due to the reliable transmission of RLC AM it is possible to provide seamless handover and general switch operation. Data packets lost between the RLC and UE due to bad radio or TN link conditions are retransmitted, so as to avoid non-congestion related packet loss, which is beneficial for TCP in terms of utilizing network capabilities. In addition to that and through the present invention, RLC retransmissions do not increase the round trip time RTT significantly, and it is possible to achieve reliable packet delivery of RLC in combination with the dropping or re-ordering of data packets. This is a particular advantage when the buffers are large and the receiving side of the RLC requests re-transmission of RLC PDU which is not lost but waiting in the buffer to be served. According to the present invention as applied to HSDPA, related inventive mechanisms avoid that many duplicate PDUs are waiting in the priority queue so as to reduce the load on the radio interface.

According to another preferred embodiment of the present invention there is provided a computer program product directly loadable into the internal memory of the processor of the network node comprising software code portions for performing the inventive process when the product is run on the processor of the network node.

Therefore, the present invention is also provided to achieve an implementation of the inventive method steps on computer or processor systems. In conclusion, such implementation leads to the provision of computer program products for use with a computer system or more specifically a processor comprised in e.g., the network node.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and hard disk drives; or information convey to a computer/processor through communication media such as network and/or telephone networks via modems or other interface devices. It should be understood that such media, when carrying processor readable instructions implementing the inventive concept represent alternate embodiments of the present invention.

While in the above, the present invention has been described with reference to the drawings and figures, it should be noted that clearly the present invention may also be implemented using variations and modifications thereof which will be apparent and can be readily made by those skilled in the art without departing from the scope and spirit of the present invention. E.g., functionalities described above may be realized in software, in hardware, or a combination thereof.

Accordingly, it is not intended that the scope of claims appended hereto is limited to the description as set forth herein, but rather that the claims should be construed so as to encompass all features of presentable novelty that preside in the present invention, including all features that would be treated as equivalent thereof by those skilled in the art to which the present invention pertains.

The invention claimed is:

1. A method of retransmission control with respect to a fragmenting transmission protocol and a stream of data packets considered for transmission, comprising the steps:
  detecting data packets in the stream of data packets which are unnecessary retransmissions based on sequence numbers of the data packets, wherein the detecting comprises:
    allocating a transmission state bit with respect to every sequence number in a sequence number space used for data packet transmission, initializing all transmission state bits to a first value prior to start of transmission of data packets, and setting a transmission state bit of a sequence number assigned to a transmitted data packet to a second value being different from the first value upon receipt of a transmission acknowledgement for the transmitted data packet;

dropping data packets which are unnecessary retransmissions from the stream of data packets for setup of a modified stream of data packets; and transmitting the modified stream of data packets over a transmission link, wherein the transmitting comprises:

transmitting a data packet considered for transmission when the transmission state bit of the sequence number assigned to the data packet is of the first value.

2. The method according to claim 1, wherein data packets having identical sequence numbers are detected as unnecessary retransmissions.

3. The method according to claim 1, further comprising the step of dropping a data packet considered for transmission when the transmission state bit of the sequence number assigned to the data packet is of the second value.

4. The method according to claim 3, wherein the step of dropping the data packet is executed prior to storage of the data packet in a priority queue.

5. The method according to claim 3, further comprising the steps:

maintaining a token bucket to enable redundant transmission of data packets;

dropping a data packet scheduled for transmission when the transmission state bit of the sequence number assigned to the data packet is of the second value and the size of the token bucket is lower than a pre-determined threshold; and re-transmitting a data packet scheduled for transmission when the transmission state bit of the sequence number assigned to the data packet is of the second value and the size of the token bucket is higher than the pre-determined threshold.

6. The method according to claim 5, further comprising the steps:

increasing the size of the token bucket by a first pre-determined step size upon one or more of receipt of a transmission acknowledgement during transmission of data packets and expiry of a pre-determined period of time; and decreasing the size of the token bucket by a pre-determined second step size upon redundant transmission of a data packet.

7. The method according to claim 1, further comprising the steps of:

identifying a first window of sequence numbers in the sequence number space such that data packets having a sequence number lying in the first window may be transmitted without receipt of a transmission acknowledgement when a new data packet is considered for transmission;

identifying a second window of sequence numbers in the sequence number space adjacent to the first window of sequence numbers when the new data packet is considered for transmission; and re-setting the transmission state bits in the second window of sequence numbers to the first value when the new data packet is considered for transmission.

8. The method according to claim 1, further comprising a step of building an ordered data structure representing an order on data packets for in-sequence delivery of data packets on the basis of sequence numbers; wherein in the ordered data structure a data element can be added, a data element with a lowest sequence number can be fetched, and a data element with a highest sequence number can be fetched.

9. The method according to claim 8, wherein the ordered data structure is a linked list which is generated by:

initializing the linked list with a selected data packet having a sequence number as root data element;

getting a next selected data packet from selected data packets which are not yet stored in the linked list as a candidate data packet having a candidate sequence number;

evaluating a first condition whether a next candidate data packet exists;

if the first condition is not true, terminating the generation of the linked list;

if the first condition is true, getting, starting from the root data element having lowest sequence number in the linked list to the data element with a highest sequence number in the linked list, a next in-list data packet having a comparison sequence number;

evaluating a second condition whether the next in-list data packet exists;

if the second condition is not true, inserting the candidate data packet subsequent to the current in-list data packet in the linked list, and repeating all steps following the initialization of the linked list;

if the second condition is true, evaluating a third condition whether the candidate data packet is to be inserted into the linked list prior to the next in-list data packet;

if the third condition is true, inserting the candidate data packet into the linked list prior to the next in-list data packet, updating the root data element, and repeating all steps following the initialization of the linked list; and if the third condition is not true, repeating the step of getting the next in-list data packet and all following steps.

10. The method according to claim 9, wherein the step of evaluating the third condition comprises:

evaluating a fourth condition whether an absolute difference between the candidate reference number and the comparison sequence number is smaller than a pre-determined comparison threshold;

if the fourth condition is true, evaluating a fifth condition whether the candidate sequence number is smaller than the comparison sequence number;

if the fifth condition is true, determining that the candidate data packet is to be transmitted before the next in-list data packet;

if the fourth condition is not true, evaluating a sixth condition whether the candidate sequence number is smaller than the comparison sequence number; and if the sixth condition is true, determining that the candidate data packet is to be transmitted after the next in-list data packet.

11. The method according to claim 1, wherein the steps are executed upon a transmission congestion state on the transmission link.

12. A network node for providing retransmission control with respect to a fragmenting transmission protocol and a stream of data packets considered for transmission, the network node comprising at least one interface to establish a transmission link, at least one processor, and a memory comprising instructions to be executed by the at least one processor, whereby the network node is adapted to:
  detect data packets in the stream of data packets which are unnecessary retransmissions based on sequence numbers of the data packets, wherein the detecting comprises:
    allocating a transmission state bit with respect to every sequence number in a sequence number space used for data packet transmission,
    initializing all transmission state bits to a first value prior to start of transmission of data packets, and
    setting a transmission state bit of a sequence number assigned to a transmitted data packet to a second value being different from the first value upon receipt of a transmission acknowledgment for the transmitted data packet;
  drop data packets which are unnecessary retransmissions from the stream of data packets for setup of a modified stream of data packets; and
  transmit the modified stream of data packets over the transmission link, wherein the transmitting comprises:
    transmitting a data packet considered for transmission when the transmission state bit of the sequence number assigned to the data packet is of the first value.

13. A computer program stored on a non-transitory computer-readable medium which, when being executed by at least one processor of a network node, causes the network node to execute a method according to claim 1.

14. A computer program product, comprising a non-transitory computer-readable medium with program code stored thereon, wherein said program code is to be executed by at least one processor of a network node, thereby causing the network node to execute a method according to claim 1.

* * * * *